March 1, 1960 J. P. TARBOX ET AL 2,926,601
HAY BALER
Filed Nov. 6, 1956 3 Sheets-Sheet 1

March 1, 1960 J. P. TARBOX ET AL 2,926,601
HAY BALER
Filed Nov. 6, 1956 3 Sheets-Sheet 2
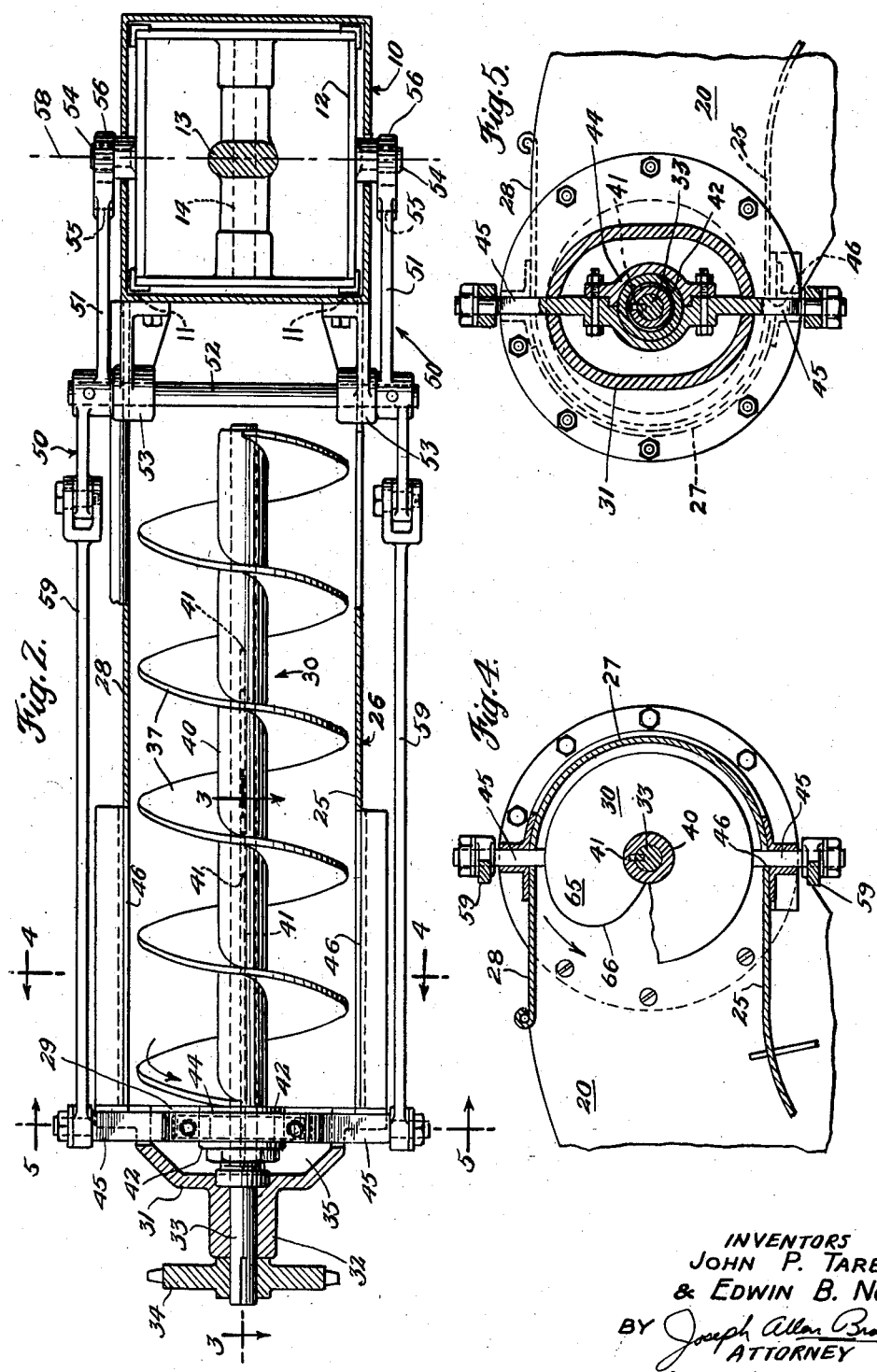
INVENTORS
JOHN P. TARBOX
& EDWIN B. NOLT
BY Joseph Allan Brown
ATTORNEY

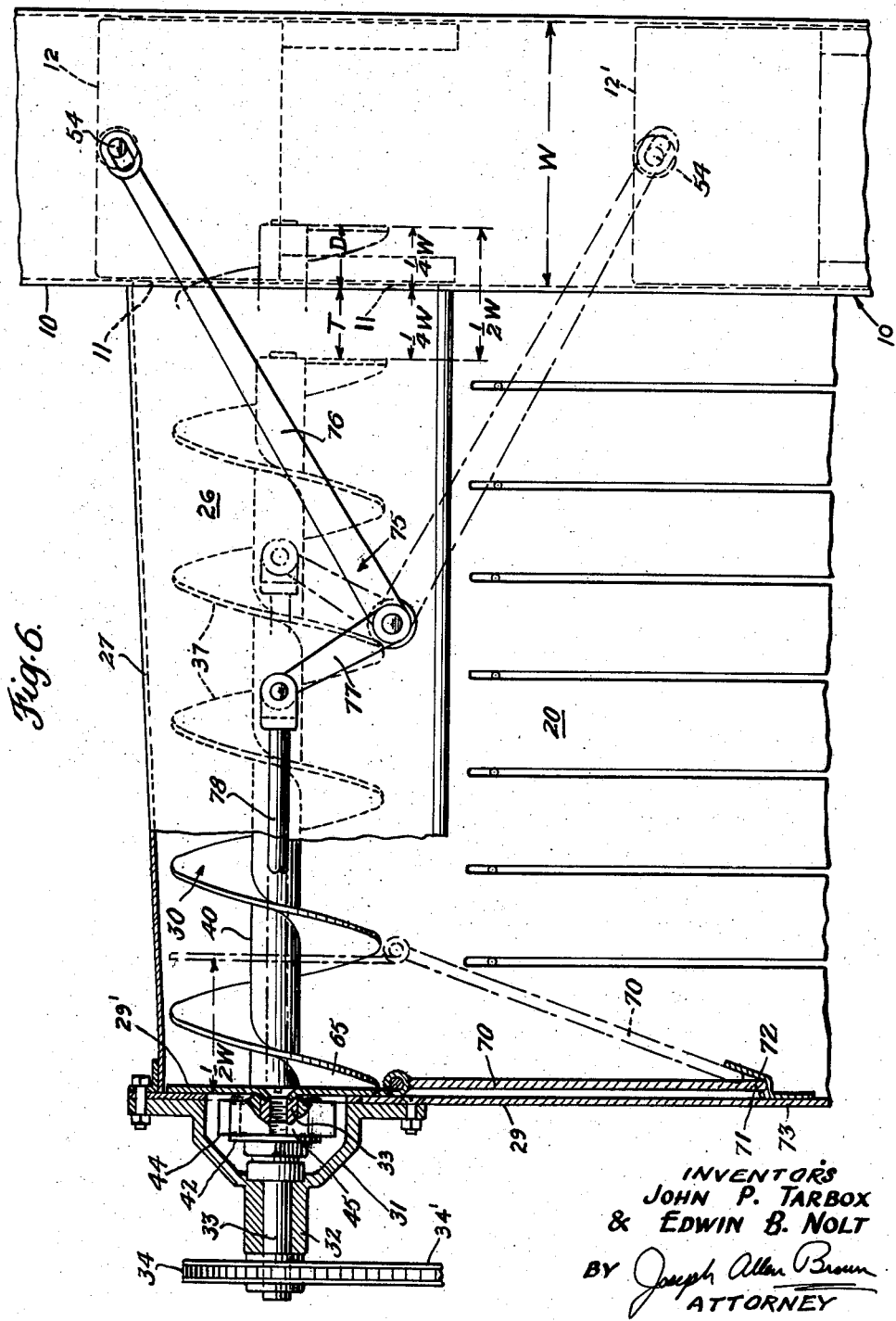

United States Patent Office 2,926,601
Patented Mar. 1, 1960

2,926,601

HAY BALER

John P. Tarbox, Philadelphia, and Edwin B. Nolt, New Holland, Pa., assignors to Sperry Rand Corporation, New Holland, Pa., a corporation of Delaware Application November 6, 1956, Serial No. 620,625

5 Claims. (Cl. 100—142)

This invention relates to hay balers of the reciprocating plunger type provided with a pick-up device and an in-feed mechanism for transferring the hay from the pick-up device toward the bale chamber embodying an auger. It is characteristic of this type of hay baler that the auger receives the hay from the pick-up device and moves it toward the bale chamber while various other intermediate devices having reciprocatory, oscillatory, rotary, or other cyclical motion, are used to project the hay so transferred into the bale chamber through a feed opening in its side or its top. These various other devices add weight, increase complication and heighten maintenance costs.

The principal object of this invention is to do away with these intermediate devices and so operate the auger as to enable it to project the material which it delivers directly into the bale case.

Other objects of the invention will be apparent hereafter from the specification and from the recital in the appended claims.

According to our invention, we employ an auger having both rotary motion about an axis substantially at right angles to the bale chamber and reciprocatory motions along that axis, the latter preferably, though not necessarily, derived from the reciprocatory motion of the plunger and in timed relation thereto.

The detailed construction and arrangement of parts through which this compound motion is attained, and through which we also obtain at one and the same time certainty of operation free from irregularities together with approximate uniformity of distribution of each charge within the bale chamber as it is introduced, will all be readily comprehended from the accompanying drawings and detailed description of the operation of the baler.

In the drawings:

Fig. 2 is a vertical section substantially on lines 2—2 of Fig. 1 and looking in the direction of the arrows;

Fig. 4 is a fragmentary, vertical, transverse section substantially on line 4—4 of Fig. 2 looking in the direction of the arrows;

Fig. 5 is a fragmentary, vertical, transverse section substantially on line 5—5 of Fig. 2 looking in the direction of the arrows; and Fig. 6 is a semi-diagrammatic, fragmentary, plan view, generally similar to the plan view of Fig. 1, and showing auger feeding means constructed according to another embodiment of this invention.

Figures 1, 3:
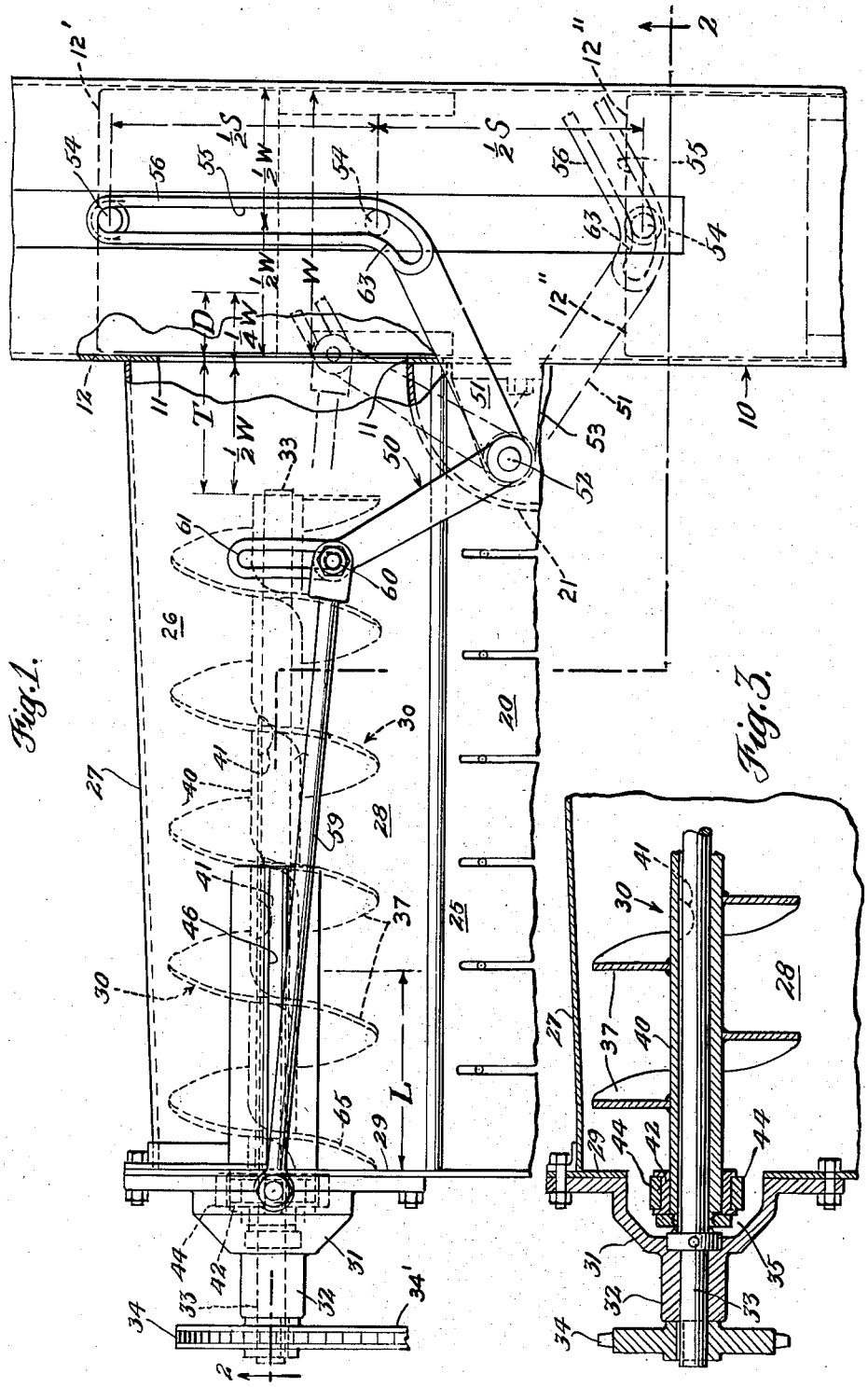
Fig. 1 is a semi-diagrammatic, fragmentary plan view of a baler having auger feeding means constructed according to one embodiment of this invention.
Fig. 3 is a fragmentary horizontal section substantially on line 3—3 of Fig. 2 and looking in the direction of the arrows.

Referring now to the drawings by numerals of reference, and particularly to Figs. 1 and 2, numeral 10 designates the bale chamber of the baler, such chamber being of rectangular cross section and having a feed opening 11 in one of its sides. Within the chamber is compressing means in the form of a reciprocable plunger 12, whose rear end appears in the sectional view in Fig. 2 and whose front end is shown in two positions, namely, 12' and 12", in dotted lines in Fig. 1. The position 12' of Fig. 1 represents the plunger at the extreme of its forward stroke at which time it has completed compression of the latest charge of material to have been introduced to the baler chamber, while the dotted line position 12" represents the front end of the plunger at the extreme of its rearward stroke. The means for reciprocating the plunger is not shown save for the connecting rod 13 by means of which it is connected to an operating crank or other rotating member (not shown) and save for the wrist pin 14 connecting the rod with the plunger.

Projecting laterally from the feed opening side of the bale chamber 10 is a pick-up device 20 of the usual, rotary, tine-fingered type. Only the upper rear portion of this pick-up device is illustrated in Figs. 1 and 4, for its detail construction does not enter into this invention.

Pick-up device 20 delivers material to be baled to a hay receiving platform or floor 25 (Fig. 2) of a housing 26 connected with the bale case 10 about the feed opening 11. In addition to the floor 25, housing 26 is comprised of rear wall 27, top wall 28, and an outer, end wall 29. It is open at the front as usual except for an arcuate vertical guide plate 21 extending from the side of the pick-up 20 to feed opening 11.

Within housing 26 is mounted and operated a rotating and reciprocating auger 30. Its mounting is by means of a staunch bearing bracket 31 connected with end wall 29 which provides a support for the auger. The bearing part 32 of bracket 31 rotatably mounts and supports a rotatable shaft 33 which projects laterally of the housing into the vicinity of the bale case. Shaft 33 mounts, supports and rotates the auger 30. Rotation of shaft 33 and auger 30 is derived from a sprocket 34 driven by an endless chain 34', deriving its power from a source, not shown.

For reciprocation auger 30 is mounted on shaft 33 by securing its flights 37 to a tubular member 40 and providing sliding key connections 41 between shaft 33 and member 40 whereby auger 30 may be slid back and forth upon shaft 33 while it continues to rotate. On its end remote from bale chamber 10, tubular member 40 bears a peripherally grooved collar 42 (Fig. 3). In the groove of this collar rides a split yoke 44 (Figs. 3 and 5). Extending vertically upward and downward from this yoke, to points respectively above and below the housing 26, are arms 45 which project through slots 46 in the floor 25 and the top 28, respectively. These arms constitute a means for connecting the auger to reciprocable means outside the housing 26 whereby the auger may be reciprocated.

A lost motion driving connection 50 connects arms 45 to plunger 10 and insures the auger being reciprocated in timed relation to plunger 12. This connection 50 comprises a pair of bell cranks 51 located respectively above and below the housing and the bale chamber and mounted upon a common vertical axle 52 supported in bearing brackets 53 projecting laterally from the bale chamber. One arm of each of these bell cranks has a pin and slot connection 54, 55 with the plunger 12 through the pins 54 located in the longitudinal plane of symmetry 58 (Fig. 2) of the bale case, the pins 54 being borne by the plunger and the slots 55 being formed in the bell crank. The opposite arms of the bell crank are linked by connecting rods 59 to the outer ends of arms 45 of the yoke 44. Therefore, when the plunger reciprocates, the rotated auger also reciprocates. However, the auger 30 is not reciprocated during the entire period of reciprocation of the plunger, for it will be noted that slots 55 are angular in form and when the position of the bell cranks 51 is that shown in full line in Figs. 1 and 2, the angular extension of portions 56 of bell cranks 51 lie in the longitudinal plane of symmetry 58 and pins 54, therefore, move in the slot extension portions 56 without producing reciprocatory movement of auger 30, and the auger is effectively locked and dwells in its outermost position. A curvilinear junction 63 between the angular portions of the slot insures gradual acceleration and deceleration of the auger.

It is highly desirable that each charge delivered by the auger to the bale chamber be packed by it transversely of the chamber at uniform density transversely of the chamber. In other words, it should be uniformly distributed over the cross section of the chamber so nearly as practicable. To this end, we proportion or adjust the ratio of the distance T (see Fig. 1) from the feed opening 11 to the end of the auger, upon its extreme outstroke, to the width W of the bale chamber at the opening, so nearly as practicable, approximately equal to the ratio of the average weight of the material discharged from the end of the auger from the time it leaves the opening on a return stroke until it starts its in-stroke, to the average weight of a complete charge. We proportion or adjust the ratio of the depth D, to which the auger enters the chamber 10, to the width W of the chamber at the feed-opening to equal approximately the ratio of the average weight of material discharged from the end of the auger from the end of its in-stroke until the auger end leaves the feed-opening, to the average weight of the material of a complete charge. Bearing in mind that the pick-up 20 and the auger 30 are commonly operated under continuous rotation from the same rotating power source which operates the plunger, and they therefore deliver material at a uniform rate, while the plunger 12 is reciprocated by a crank (not shown) through connecting rod 13, and the auger 30 reciprocated from it, move at a rate proportional to the line of the angle subtended by such a crank during its rotation, we estimate one such approximation to result in a distance T equal approximately to one-half the width W, and the depth D to which the auger enters the bale chamber to be approximately one-fourth of the width W.

To enable the chosen proportions to be approximated still more closely there is provided a pin and slot connection 60—61 between bell cranks 51 and connecting rods 59. The slots 61 are formed on an arc about the outboard connection to arms 45 and of a radius equal to the length of connection rods 59 whereby the length L of the auger stroke may be adjusted by moving pins 60 up or down in slots 61 and locking them in position by any suitable means without altering the relationship of the adjacent end of auger 30 to the end wall 29 of housing 26. Thus, by changing the length L of the auger stroke changes the depth of penetration D but does not change the distance T.

It is also desirable that there be no overfeeding by the pick-up in the region of the end of the auger adjacent wall 29 during the reciprocation of the auger. Such overfeeding while the auger end is away from the housing end wall 29 might result in clogging of the auger as it performed its out-stroke. To meet this, the rate of rotation of the auger is made several times its rate of reciprocation, in the order of five or six to one, and the time required for its stroke is made less than that required for overfeeding of any flight of the auger by the pick-up when the pick-up is operated at its normal average pick-up rate or under moderate overloading. This proportion is maintained irrespective of the diameter and pitch of the auger.

A further aid to this end is had by constructing the outermost flight 65 (see particularly Figs. 1 and 4) with its terminal edge 66 in entirety to rotate when at the outermost extreme of its stroke, tangent or contiguous to the end wall 29 of the housing, and by adjusting the time relation between the rotation of the auger and its reciprocation in such manner that at the time the auger reaches this position (that illustrated in Figs. 1 and 4) edge 66 is extending upwardly as shown in Fig. 4. Thus it does not cut across crop material which lies adjacent wall 29, but as it contacts and/or retains contact with that wall, sweeps the adjacent crop material cleanly into the endmost flight. Nor is crop material pressed between the endmost flight and the wall as the flight approaches the wall. To clear wall 29 through this action, the bearing bracket 31 is recessed at 35 as shown to receive collar 42 and yoke 44 within the inner face of wall 29.

Still further, the rotation of the auger bears such timed relation to its reciprocation that the terminal edge 66 reaches end wall 29 on a return stroke at a point above the housing floor 26 above the average height of material received by the auger in this region.

An alternative construction is that shown in Fig. 6 in which a supplemental end wall member 29' is attached to and moves with yoke 44. Wall 29' has a hinged forward extension or deflection plate 70 whose forward end 71 is restrained from lateral movement by lost motion connection 72 with the forward end 73 of the side wall of the pick-up 20. The edge of endmost flight 65 is shaped similar to that shown at 66 in Fig. 4 and rotates continuously contiguous to the reciprocated supplemental end wall 29' while its hinged forward extension 70 acts to deflect adjoining infeed from the pick-up into the auger flights and prevent them from accumulating behind the outermost flight during the auger reciprocation.

As indicated in the description of the drawings, Fig. 6 depicts a modification. This is true not only in the provision of reciprocated end wall members 29' and extension 70, but also in the provision of a modified auger drive connection to the plunger. In Fig. 6, arms 76 and 77 of bell cranks 75 (which correspond to the arms of bell cranks 50) do not have slotted angular extension such as 56, but their arms 76 instead are straight throughout their length and connect with drive pins 54 at their extremities only. The result is that the auger is in continuous reciprocation and does not dwell officially at the outermost extremity of its stroke.

Furthermore, we have in this case foreshortened the stroke by proportioning the lever arms, making it but ½W (W, the width of the bale case); and have made the distance T of travel outside the case equal to the depth D of penetration into the case, each of them equally ¼ of the casing width W. Calculations following the conditions above set forth in connection with Figs. 1 and 2 indicate that their proportions should ensure approximate uniform distribution of charge across the bale case.

While the invention has been described in connection with two embodiments thereof, it will be understood that it is capable of further modification, for there may be provided yet other devices for operating the auger and other constructions for the end of the auger remote from the bale chamber. This application is intended to cover any variations, uses or adaptations of the invention following, in general, the principles of the invention and including such departures from the present disclosure as come within known or customary practice in the art to which the invention pertains, and as fall within the scope of the invention on the limits of the appended claims.

Having thus described our invention, what we claim is:

1. A baler for crop material comprising a bale chamber having a feed opening in a vertical side wall thereof, means in said bale case for cyclic operation to compress material introduced through said opening into bales, a platform extending from said opening and upon which material may be deposited, a rotatable-reciprocable auger for conveying deposited material across said platform, through said opening and into said chamber, said auger having an end proximate to said bale chamber and an end remote therefrom, a support, means connecting said remote end of said auger to said support whereby the auger may shift axially bodily relative thereto, means for rotating said auger, means for reciprocating said auger to project said proximate end into said bale chamber in timed relation to the cyclic operation of said compressing means, a deflector for preventing material from lodging between said remote end of said auger and said support, means pivotally connecting one end of said deflector to said auger remote end, and means for connecting an opposite end of said deflector to said support.

2. A baler for crop material comprising a bale chamber having a feed opening in a vertical side wall thereof, means in said bale case for cyclic operation to compress material introduced through said opening into bales, a platform extending from said opening and upon which material may be deposited, a rotatable-reciprocable auger for conveying deposited material across said platform, through said opening and into said chamber, said auger having an end proximate to said bale chamber and an end remote therefrom, a support, means connecting said remote end of said auger to said support whereby the auger may shift axially bodily relative thereto, means for rotating said auger, means for reciprocating said auger to project said proximate end into said bale chamber in timed relation to the cyclic operation of said compressing means, a member affixed adjacent said remote end of said auger and movable axially with the auger as it reciprocates, a deflector plate for preventing material from lodging between said remote end of said auger and said support, means pivoting one end of said deflector to said member, and means providing a both slidable and pivotal connection between an opposite end of said deflector and said support.

3. A baler as recited in claim 1 wherein said means for reciprocating said auger includes a lost-motion means providing a dwell of the auger at the end of each working stroke.

4. A baler as recited in claim 1 wherein said means for reciprocating said auger includes means for adjusting the distance which said auger proximate end is projected into the bale chamber.

5. A baler as recited in claim 1 wherein said compressing means comprises a plunger, and said reciprocating means comprises a linkage connected to the top and bottom of said plunger, respectively, and said remote end of said auger.

References Cited in the file of this patent

UNITED STATES PATENTS

| | | |
|---|---|---|
| Re. 21,132 | Innes | June 27, 1939 |
| 2,720,073 | Freeman et al. | Oct. 11, 1955 |
| 2,754,652 | Gilder | July 17, 1956 |
| 2,835,100 | McClellan | May 20, 1958 |
| 2,835,101 | Morrison | May 20, 1958 |